(12) United States Patent
O'Brien et al.

(10) Patent No.: US 9,145,819 B2
(45) Date of Patent: Sep. 29, 2015

(54) HYBRID FASCIA MOUNTED EXHAUST TIP ASSEMBLY

(71) Applicant: Magna International Inc., Aurora (CA)

(72) Inventors: Timothy F. O'Brien, White Lake, MI (US); Lonnie E. Adkins, Grand Blanc, MI (US); Dean B. Comeau, Guelph (CA); Chris Deforest, Guelph (CA)

(73) Assignee: Magna International Inc., Ontario (CA)

( * ) Notice: Subject to any disclaimer, the term of this patent is extended or adjusted under 35 U.S.C. 154(b) by 0 days.

(21) Appl. No.: 14/669,177

(22) Filed: Mar. 26, 2015

(65) Prior Publication Data

US 2015/0198078 A1    Jul. 16, 2015

Related U.S. Application Data

(63) Continuation-in-part of application No. 14/447,096, filed on Jul. 30, 2014, which is a continuation of application No. 13/351,776, filed on Jan. 17, 2012, now Pat. No. 8,863,886.

(60) Provisional application No. 61/574,251, filed on Jul. 29, 2011, provisional application No. 61/574,330, filed on Aug. 1, 2011.

(51) Int. Cl.
   *F01N 13/08*   (2010.01)
   *F01N 13/18*   (2010.01)
   *F16J 15/08*   (2006.01)
   *F01N 13/10*   (2010.01)

(52) U.S. Cl.
   CPC .............. *F01N 13/082* (2013.01); *F01N 13/08* (2013.01); *F01N 13/10* (2013.01); *F01N 13/18* (2013.01); *F01N 13/1805* (2013.01); *F01N 13/1827* (2013.01); *F16J 15/0818* (2013.01); *F16J 15/0831* (2013.01)

(58) Field of Classification Search
   None
   See application file for complete search history.

(56) References Cited

U.S. PATENT DOCUMENTS

| | | | | |
|---|---|---|---|---|
| 3,870,083 A * | 3/1975 | Nezat | | 138/45 |
| 4,629,226 A * | 12/1986 | Cassel et al. | | 285/382 |
| 4,779,904 A * | 10/1988 | Rich | | 285/345 |
| 5,466,900 A * | 11/1995 | Knapp | | 181/227 |
| 5,508,478 A * | 4/1996 | Barry | | 181/227 |
| 7,007,720 B1 * | 3/2006 | Chase et al. | | 138/110 |

(Continued)

FOREIGN PATENT DOCUMENTS

| | | |
|---|---|---|
| EP | 1 816 325 | 3/2010 |
| JP | 2004308551 | 11/2004 |

OTHER PUBLICATIONS

"Invitation to Pay Additional Fees and, Where Applicable, Protest Fees" for priority PCT Application No. PCT/US2012/048597; mailed Feb. 15, 2013.

*Primary Examiner* — John Walters
*Assistant Examiner* — Hilary L Johns
(74) *Attorney, Agent, or Firm* — Warn Partners, P.C.

(57) ABSTRACT

An exhaust module made of a thermoplastic material which is connected to a fascia or bumper of a vehicle. In one embodiment, the hybrid fascia mounted exhaust tip assembly includes a bracket. The bracket has a bracket inlet which surrounds, but is not in contact with, an exhaust pipe. The exhaust pipe is free to move around as a result of the vehicle traveling over bumps in the road and around turns. The bracket also has a bracket outlet which is connected to the bracket inlet. A ring tip has a portion that slides onto a bezel portion of the bracket outlet.

29 Claims, 14 Drawing Sheets

(56) References Cited

U.S. PATENT DOCUMENTS

| | | |
|---|---|---|
| 7,246,826 B2 * | 7/2007 | Ignaczak et al. .............. 285/382 |
| 7,458,619 B2 * | 12/2008 | Cassel et al. .................. 285/420 |
| 7,686,131 B1 * | 3/2010 | Osterkamp et al. ........... 181/227 |
| 7,770,937 B2 * | 8/2010 | Ignaczak et al. .............. 285/261 |
| 7,775,561 B2 * | 8/2010 | Swank .......................... 285/337 |
| 8,863,886 B2 | 10/2014 | O'Brien et al. |
| 2004/0232625 A1 * | 11/2004 | Kerchner et al. ............. 277/590 |
| 2005/0061571 A1 * | 3/2005 | Chen ............................. 180/309 |
| 2006/0070789 A1 | 4/2006 | Dirkson |
| 2009/0265934 A1 * | 10/2009 | Lee et al. ................... 29/890.08 |

* cited by examiner

HYBRID FASCIA MOUNTED EXHAUST TIP ASSEMBLY

CROSS-REFERENCE TO RELATED APPLICATIONS

This application is a Continuation-in-Part of U.S. patent application Ser. No. 14/447,096 filed Jul. 30, 2014, which is a Continuation of U.S. patent application Ser. No. 13/351,776 filed Jan. 17, 2012, which claims benefit of U.S. Provisional Patent Application Nos. 61/574,251 filed Jul. 29, 2011 and 61/574,330 filed Aug. 1, 2011.

FIELD OF THE INVENTION

The present invention relates to hybrid fascia mounted exhaust module made primarily of thermoplastic material resistant to corrosion, which requires minimal secondary operations during assembly.

BACKGROUND OF THE INVENTION

Exhaust systems are used for just about every type of vehicle currently in production around the world. It is commonplace for vehicle owners to add accessories to the vehicle to change the appearance of the vehicle. Once particular type of accessory is a decorative exhaust tip typically made of steel or another type of metal which is chrome plated to provide for an aesthetically pleasing appearance.

One type of design uses a slip-on type steel exhaust tip that is connected directly to the end of the exhaust pipe. This design is subject to corrosion and requires additional welding during assembly operations.

FIGS. 1-2 depict a prior art design that has a metal exhaust module 100 that attaches to the rear bumper fascia 102 of the vehicle. The exhaust module 100 has metal body 104 and welded mounting flanges 106. The welded flanges 106 are used to connect the metal body 104 a larger spacer bracket 108 that connects to the rear fascia 102. The connection of the welded flanges 106, spacer 108 and rear fascia 102 is made with several bolts 110 and nuts 112. An outer surface 114 of the metal body 104 is often chrome polished or painted and can be seen when a person looks at the rear bumper fascia 102 of the vehicle. The exhaust module 100 is not connected to the exhaust pipe but has an inlet portion 103 that is positioned in close relation to the end of the exhaust gas tailpipe for receiving and passing exhaust gas through the exhaust module. Exhaust modules of this type often are formed of several welded steel parts and brackets that come into direct contact with the exhaust gas from the exhaust pipe being formed of steel or some other types of metal.

The above described designs result in undesirable gap between the chrome tip of the exhaust tip or exhaust module and the rear bumper fascia of the vehicle because the design must account for thermal expansion of the metal portions exposed to the hot gasses from the exhaust pipe. The exhaust modules designs that mount to the rear fascia also add a considerable amount of weight causing undue stress on the rear fascia, which is often made of plastic. Also both the metal slip on exhaust tip and exhaust module designs described above are costly to produce because they are primarily made of metal. It is therefore desirable to design an exhaust module that is light weight, low cost, and aesthetically pleasing by having a tight fit or minimal gap to the rear fascia of the vehicle. It is also desirable to produce an exhaust gas module that has a minimal number of components for ease of assembly, which would also result in cost savings.

SUMMARY OF THE INVENTION

The present invention is an exhaust module for a vehicle made from a thermoplastic material and is connected to a fascia or bumper of the vehicle. The exhaust module assembly includes one of a two piece bracket formed entirely of polymer and defines an exhaust flow path through the two piece bracket. The two piece bracket includes a first bracket body piece and a second bracket body piece. Between the first bracket body piece and the second bracket body piece is an alignment groove that is formed on one of the first bracket body piece or the second bracket piece and a rib is formed on the other one of the first bracket body piece or second bracket body piece, such that the rib aligns in the alignment groove and functions to connect and align the first bracket body piece and second bracket body piece together. A bracket inlet of the two piece bracket surrounds, but is not in contact with an exhaust pipe of a vehicle. This creates a clearance between the exhaust pipe and the bracket inlet. The exhaust assembly also includes a bracket outlet of the two piece bracket connected to the bracket inlet. A ring tip is connected to the bracket outlet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
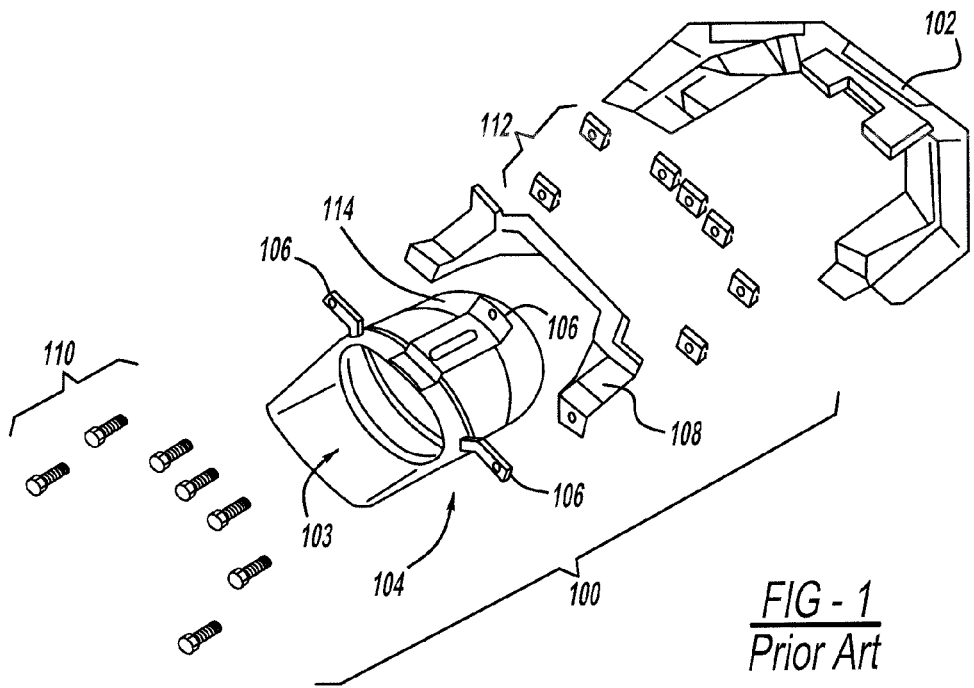
FIG. 1 is an expanded perspective view of a prior art exhaust gas module and fascia.

The following description of the preferred embodiment(s) is merely exemplary in nature and is in no way intended to limit the invention, its application, or uses.

Referring to the FIGS. 2A, 2B, 4A, 4B, 4C, 5, 6 and 7C, which are the Figs. of the embodiments of the present invention generally, an exhaust module according to the present invention is shown generally at 10. The module 10 includes a bracket, shown generally at 12, and a ring tip, shown generally at 14. The bracket 12 has a plurality of mounting flanges 16, which are used for connecting the bracket 12 to the fascia or bumper of a vehicle (not shown).

The bracket 12 includes a bracket inlet 18 and a bracket outlet 20. The bracket inlet 18 surrounds the end portion of an exhaust pipe 42, which is connected to a muffler, or other exhaust system component. The bracket inlet 18 is about four inches in diameter, and the exhaust pipe 42 is about two inches in diameter, which creates about a one-inch clearance between the exhaust pipe 42 and the bracket inlet 18 of the bracket 12. This clearance limits the exposure of the bracket 12 to the temperatures of the exhaust pipe 42, and allows for the exhaust pipe 42 to have some movement, or "play," as the vehicle travels over bumps, around curves, and the like. While a diameter of four inches for the bracket inlet and a diameter of two inches for the exhaust pipe is disclosed, it is within the scope of this invention for different diameters to be used depending upon the size of the diametrical size of the exhaust pipe.

The bracket 12 in one embodiment of the invention is formed entirely of plastic or polymer such as glass filled nylon, ABS or other polymer materials such as thermoplastic olefins. Forming the bracket 12 out of entirely polymer material is a significant advantage over the prior art which is typically formed of some type of metal, such as steel. Therefore, it is within the scope of this invention for the bracket 12 and to not be formed of metal. It is also within the scope of this invention for the bracket 12 including the bracket inlet 18, bracket outlet 20 to not be formed of metal. It is further within the scope of this invention for the bracket 12, including the bracket inlet 18, bracket outlet 20 and mounting flanges 16 to not be formed of metal. It is also within the scope of this invention for the bracket 12, including the bracket inlet 18, bracket outlet 20, mounting flanges 16 and ring tip 14 to not be formed of metal.

Figure 2:
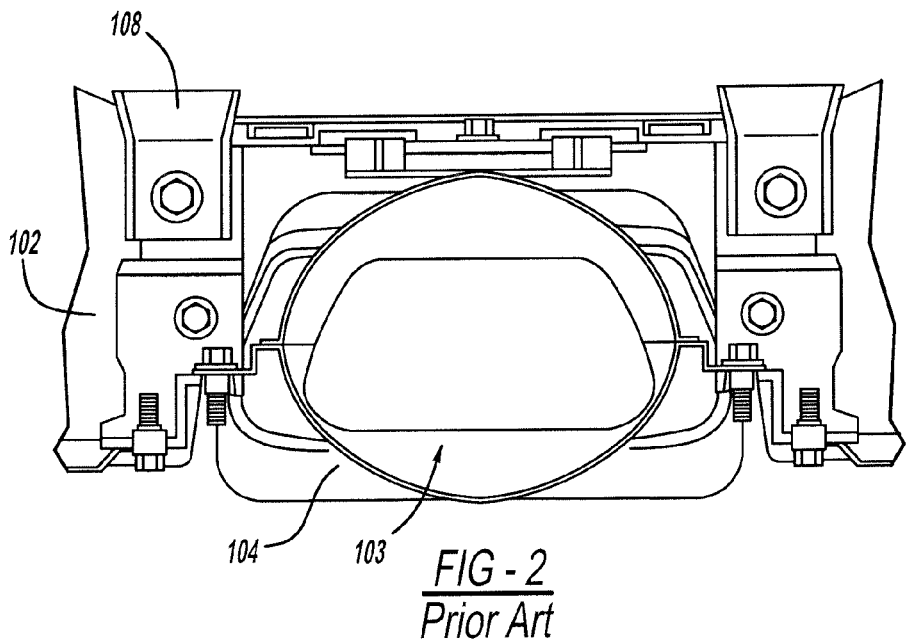
FIG. 2 is a side plan view of a mounted prior art exhaust gas module to a rear fascia of a vehicle.
Figure 2A:
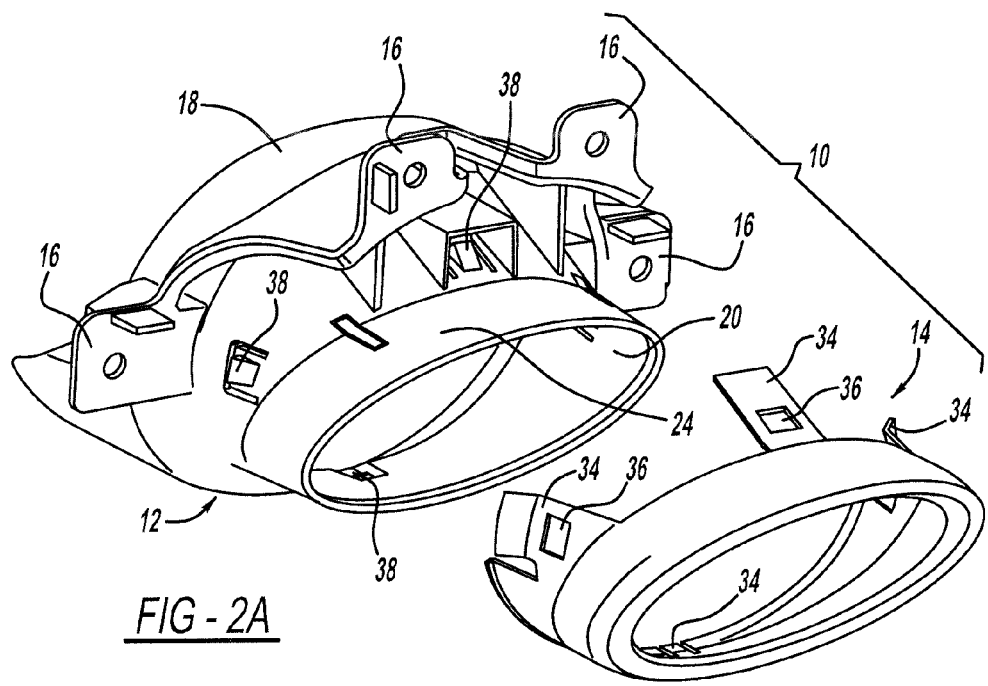
FIG. 2A is an expanded perspective view of an exhaust gas module in accordance with one embodiment of the present invention.
Figure 2B:
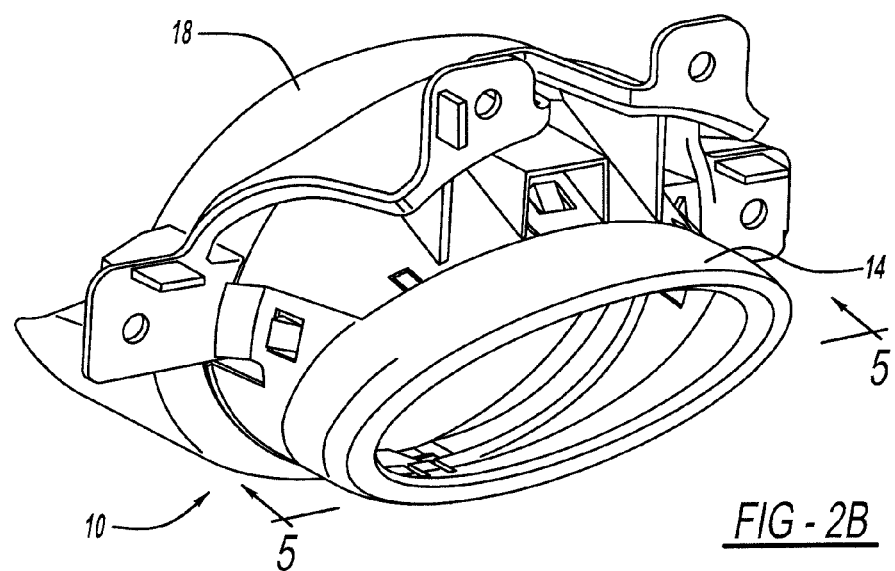
FIG. 2B is a perspective view of an assembled exhaust gas module in accordance with one embodiment of the present invention.
Figure 5:
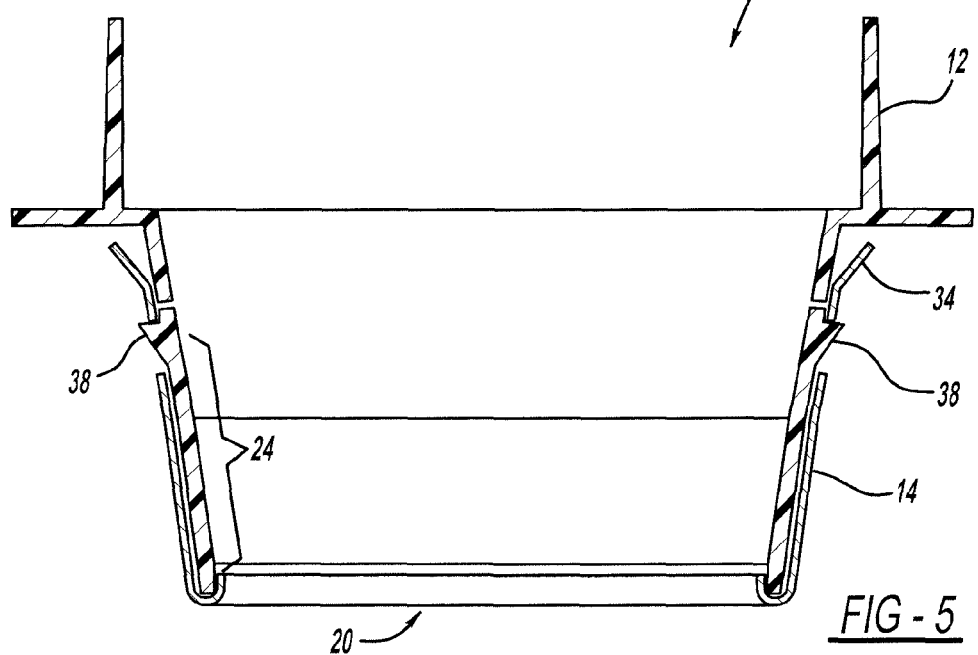
FIG. 5 is a cross-sectional plan view of the exhaust gas module assembled to the bracket taken along section line 5 in FIG. 2B.

The connection between the ring tip 14 and bracket 12 can vary depending on the particular embodiment of the invention. Referring to FIGS. 2A, 2B and 5 the ring tip 14 is connected to the bracket 12 by snap fit tabs. The ring tip 14 has resilient tabs 34 having apertures 36 that connect with protrusions 38 formed on the bracket 12. In another embodiment of the invention shown in FIGS. 4A and 4B the ring tip 14 is slid over the bracket outlet 20 until the mounting features 26 of the bracket outlet 20 becomes interlocked with the mounting features 28 formed integrally with a sleeve 30 of the ring tip 14. In this particular embodiment the mounting features 26, 28 are a "toy tab" or tongue in groove feature. In other embodiments, the ring tip 14 and bracket 12 are connected through other processes, such as adhesion, vibration welding, or the like.

In the embodiments of the invention described herein the bracket 12 has a bracket outlet 20. The bracket outlet 20 is connected to the bracket inlet 18 through a tapered portion or bezel portion 24. The sleeve 30 of the ring tip 14 terminates at a groove 32 portion of the ring tip that receives at least part of the bracket outlet 20 when the module 10 is assembled together. When assembled the bezel portion of the bracket outlet 20 rests against and supports the ring tip 14. This allows the ring tip 14 to be made thinner, which cuts cost and weight. The ring tip 14 in one embodiment is formed of thin gauge stainless steel that is less than fifty thousandths of an inch thick. In another embodiment of the invention the ring tip 14 is formed of thin gauge stainless steel that is between twenty thousandths to forty thousandths of an inch thick. In another embodiment of the invention the ring tip 14 is formed of thin gauge stainless steel that is between twenty thousandths and thirty thousandths of an inch thick. The thickness of the ring tip 14 can vary depending upon the environmental factors, including exhaust gas temperatures exposure for a particular application. It is also possible for the ring tip 14 to be formed of polymeric material and would include a chrome plated plastic that is accomplished using a Polychlorinated Biphenyls PCBs resin or ABS resin with subsequent chrome plating of the resin material.

Figure 7A:
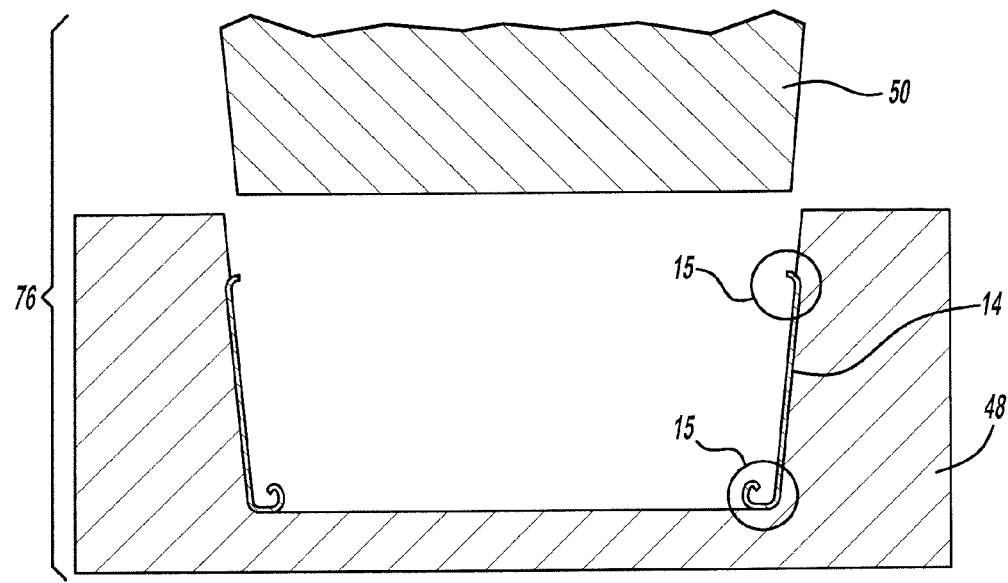
FIG. 7A is a cross-sectional side schematic view of a mold machine for an alternate embodiment of the present invention where the ring tip is insert molded to the bracket.
Figure 7B:
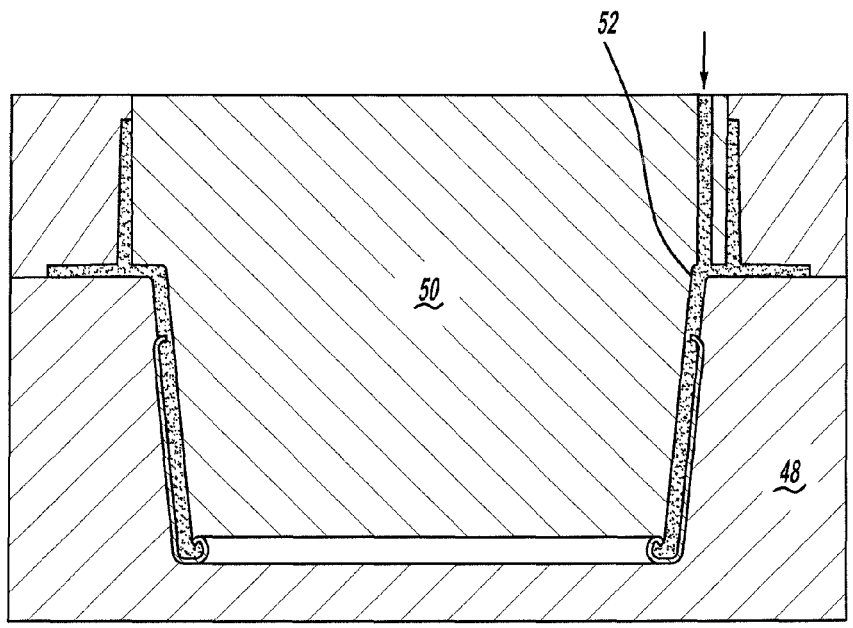
FIG. 7B is a cross-sectional side schematic view of a mold machine for an alternate embodiment of the present invention where the ring tip is insert molded to the bracket.
Figure 7C:
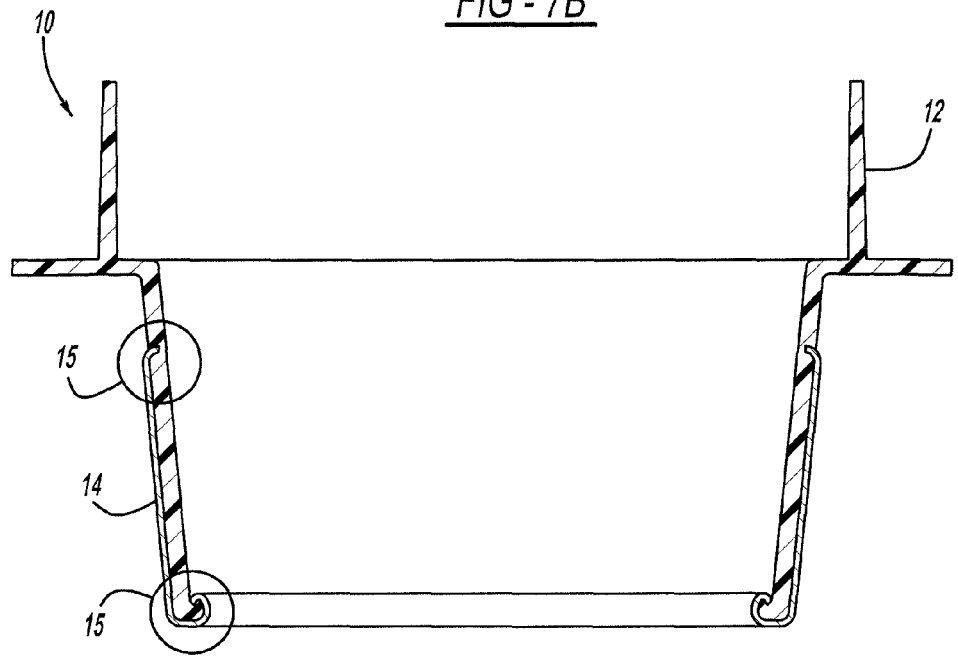
FIG. 7C is a cross-sectional side view of an alternate embodiment of the exhaust module wherein the ring tip has been insert molded onto the bracket.

An alternate method of assembling the ring tip 14 to the bracket 12 is shown in FIGS. 7A-7C wherein insert molding is used to connect the ring tip 14 to the bracket 12. This process involves pre-forming the ring tip 14, which has flow grooves 15 formed at opposite edges of the ring tip 14. The ring tip 14 is placed into a mold cavity of 1 a first platen 48 of a molding machine 46. A second platen 50 is closed on to the first platen 48 and molten polymer 52 is flowed into the molding machine 46 to form the bracket 12. The ring tip 14 becomes connected to the bracket 12 by molten polymer 52 material flowing into the flow grooves 15 of the ring tip 14 prior to solidifying and forming the completed bracket 12.

Once the ring tip 14 is connected to the bracket 12 according to either the snap fit, toy tab, or insert molded methods of assembly described above, the ring tip 14 is brushed and polished to achieve an aesthetically acceptable part. Performing the brush and polish step once assembly is completed allows for the removal of any mold release material that can be present, particularly if the insert molding method of assembly is used. The brush polishing step also removes scratches or flash material that can be present on the ring tip 14.

Figure 6:
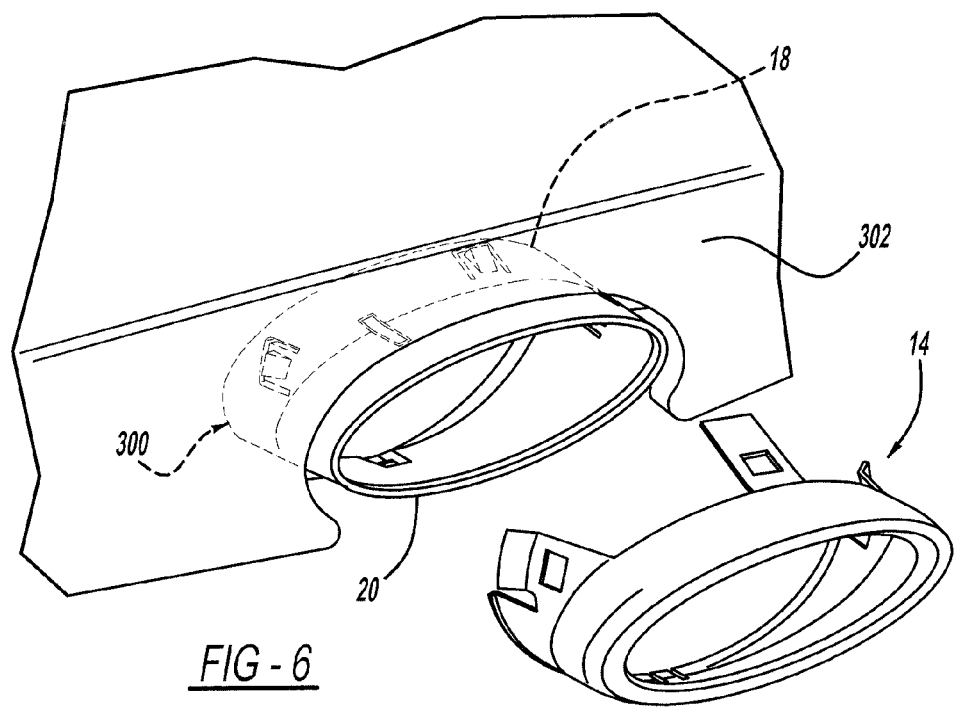
FIG. 6 is an expanded perspective view of an alternate embodiment of the exhaust module assembly wherein the bracket is integrated into the rear fascia.

FIG. 6 shows another alternate embodiment of the invention wherein an exhaust module 300 is integrated into a fascia 302. In this particular embodiment of the invention, the bracket 12 shown in the other embodiments is not present since the exhaust module 300 is molded into the rear fascia during the process of forming the rear fascia. Once the rear fascia 302 is co-formed, a bracket inlet 18 and bracket outlet 20 is present and is capable of receiving the ring tip 14. The ring tip 14 can connect to the bracket outlet 20 in the same manner as described in all the embodiments above. This particular embodiment of the invention further eliminates components by no longer requiring a bracket 12 and fasteners for connecting to the rear fascia. Additionally, prior to assembly of the ring tip 14, the fascia 302 can be painted or completed without any special or additional steps since the ring tip 14 will be connected to the bracket outlet 20 in a subsequent step. Therefore, there is no concern about painting or treating the exhaust module 300 during the formation of the fascia 302.

Figure 3A:
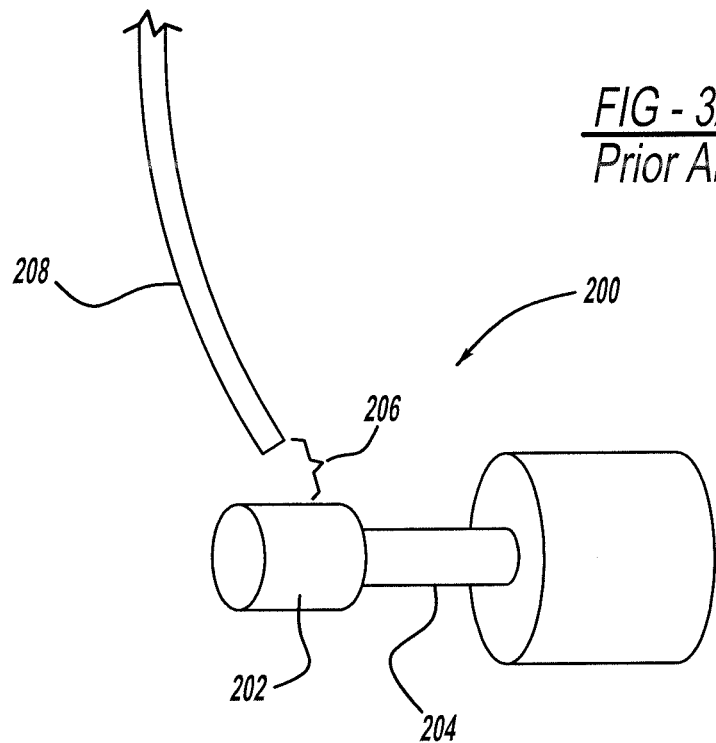
FIG. 3A is a schematic side view diagram of a prior art exhaust tip connected to an exhaust pipe and positioned relative to a portion of a partially broken away portion of the rear fascia.
Figure 3B:
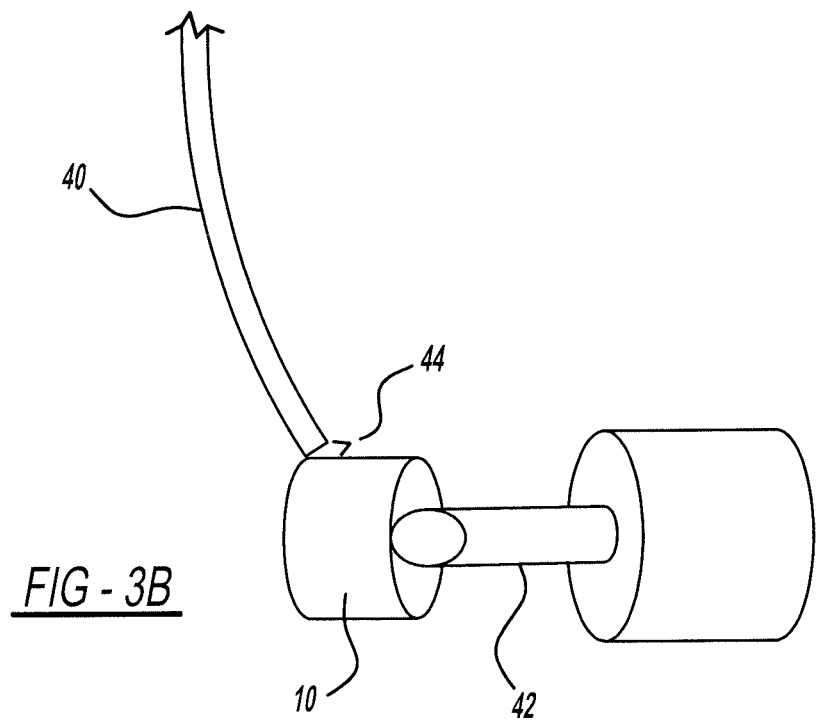
FIG. 3B is a side schematic view of an exhaust module relative to the rear fascia and exhaust pipe in accordance to one embodiment of the present invention.
Figure 4A:
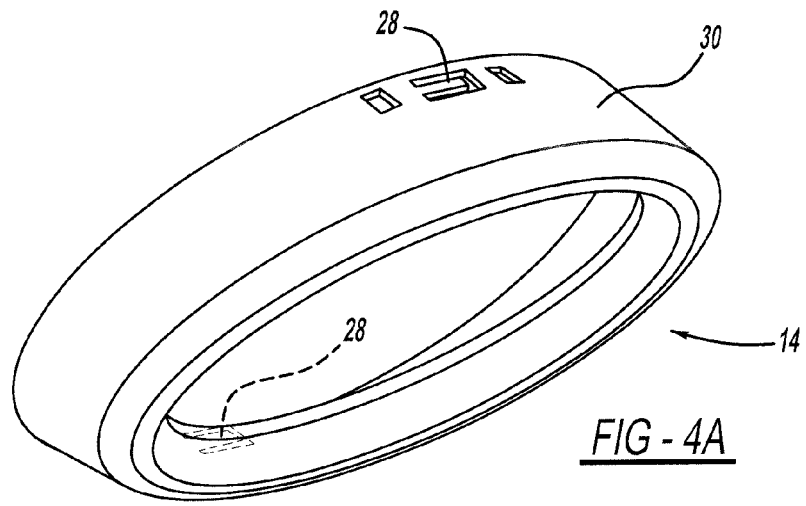
FIG. 4A is a perspective view of an alternate embodiment of a ring tip in accordance with one embodiment of the present invention.
Figure 4B:
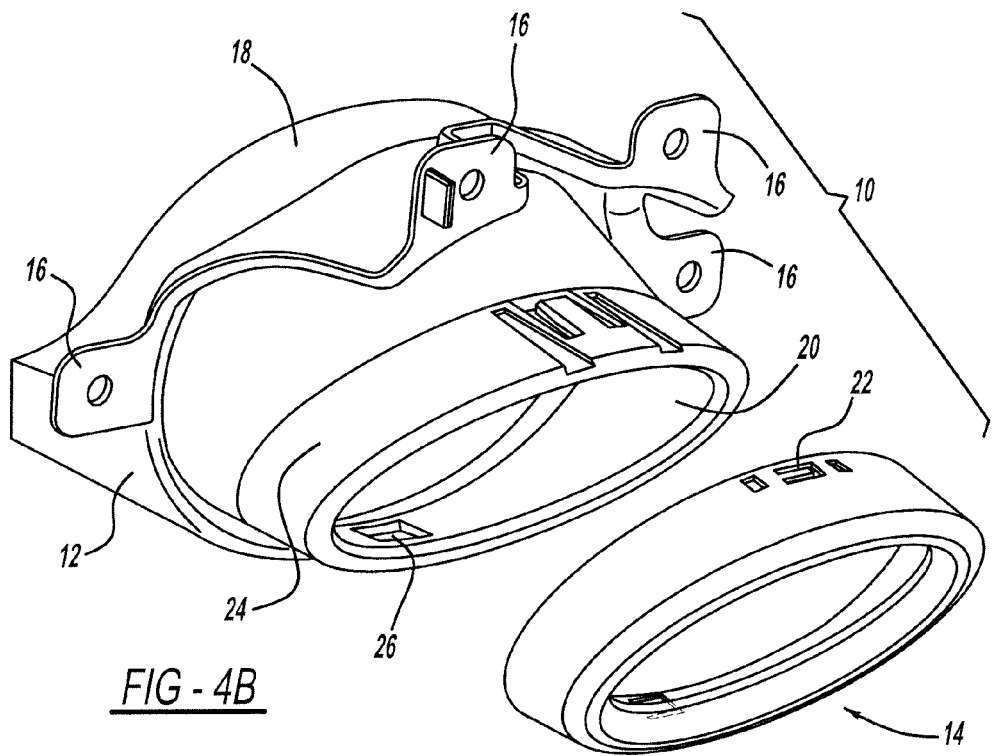
FIG. 4B is an expanded perspective view of an alternate embodiment of the bracket assembly and ring tip of the exhaust gas module in accordance with the present invention.
Figure 4C:
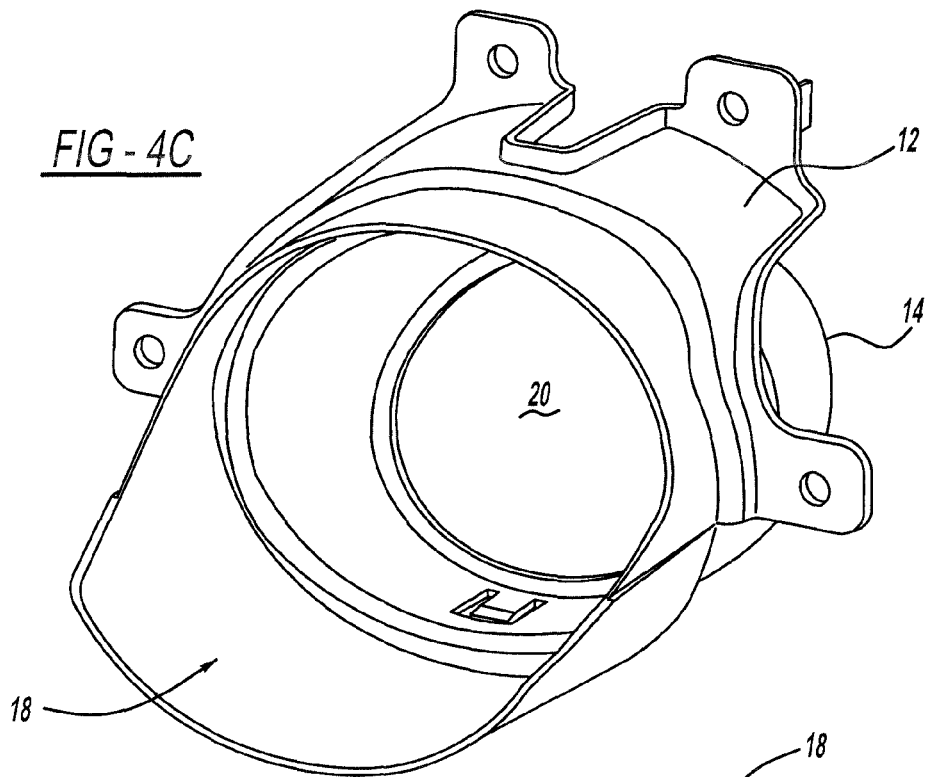
FIG. 4C is a perspective view of the assembled exhaust gas module of FIG. 4B.

Referring now to FIGS. 3A and 3B, the advantages of the present invention are over prior art as shown. FIG. 3A is a schematic side view of a prior art steel exhaust tip assembly 200. A steel exhaust tip 202 is connected to the end of an exhaust tail pipe 204, usually by welding, fasteners or some other attachment mechanism. The steel exhaust tip 202 is positioned below a rear fascia 208 at a distance that provides a suitable gap 206 between the rear fascia 208 and the steel exhaust tip 202. The gap 206 distances can vary but is usually approximately 28 mm or enough distance to account for thermal expansion of the exhaust tip 202 and movement of the assembly 200 as the vehicle moves.

FIG. 3B shows the exhaust module 10 schematically assembled to a rear fascia 40 in accordance with the present invention. A gap 44 is shown between the exhaust module 10 and rear fascia 40. The gap 44 is less than or equal to 5 mm. Thus, the present invention is an improvement over the prior art because a more aesthetically pleasing appearance can be achieved due to the tighter fit and reduced gap 44 between the exhaust module 10 and rear fascia 40.

One reason for the present invention's improvement over prior designs is that the prior designs use a large percentage of metal parts, which requires the designs to account for thermal expansion of the exhaust tip or steel exhaust module. The exhaust module 10 of the present invention is formed entirely of polymer material and in one embodiment implements a thin gauge steel ring tip 14. A smaller gap can be achieved since the polymer material of the exhaust module 10 will not be subject to the same level of thermal expansion that the prior modules are exposed to. Thus, forming the exhaust module 10 of polymer material represents an improvement over existing exhaust modules and exhaust tip designs.

The bracket 12 is a glass-filled, nylon part, or is made from another type of thermoplastic material. The ring tip 14 is made from a polycarbonate (PC), acrylonitrile butadiene styrene (ABS), or other type of thermoplastic material which is injection molded. The ring tip 14 is also chrome plated, to provide an aesthetically pleasing appearance.

Figure 8:
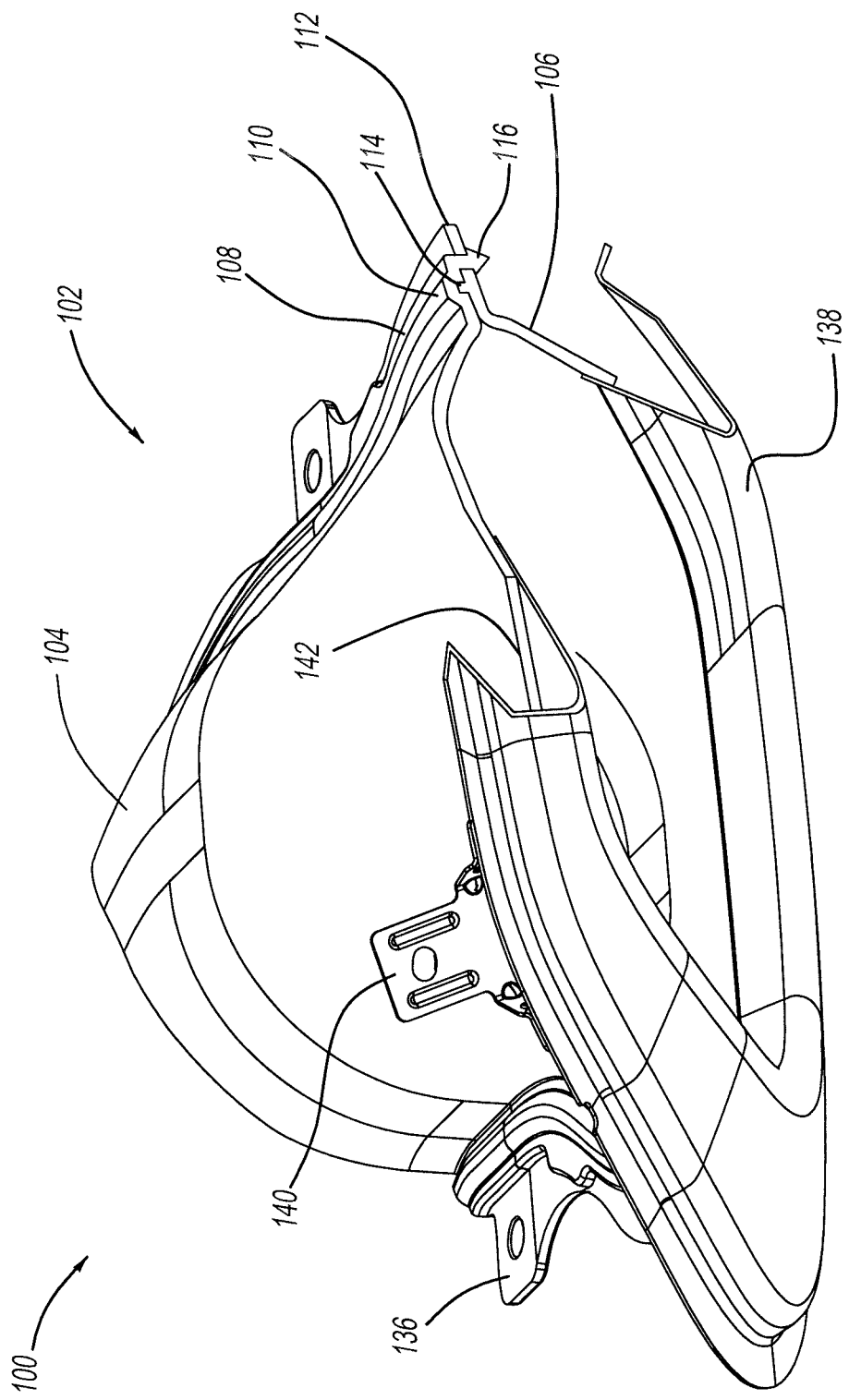
FIG. 8 is a partially sectioned angled top perspective view of a two piece bracket in accordance with another embodiment of the invention.
Figure 9:
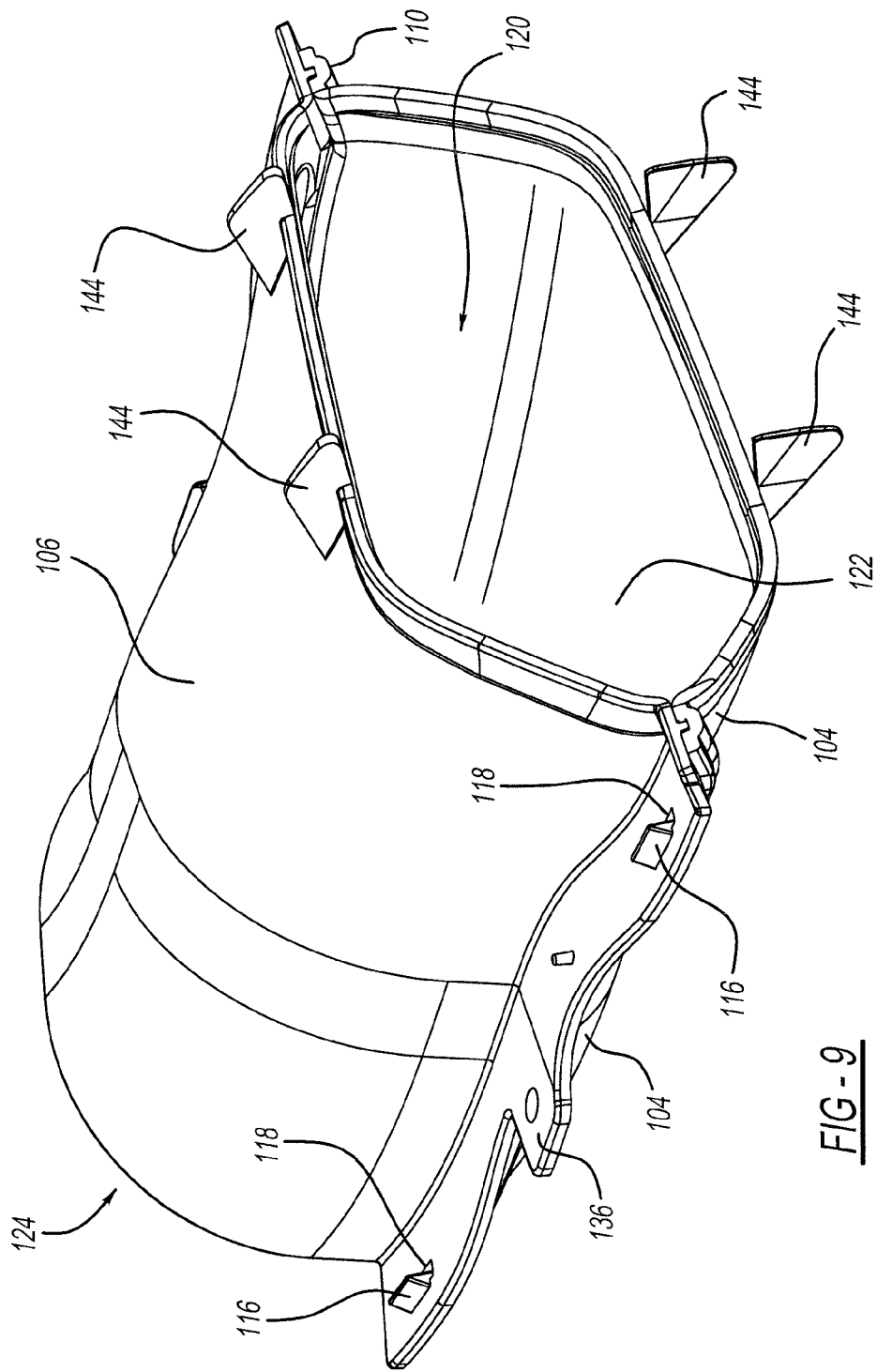
FIG. 9 is a side perspective view of a two piece bracket having the ring tip removed in accordance with the present embodiment of the invention.
Figure 10:
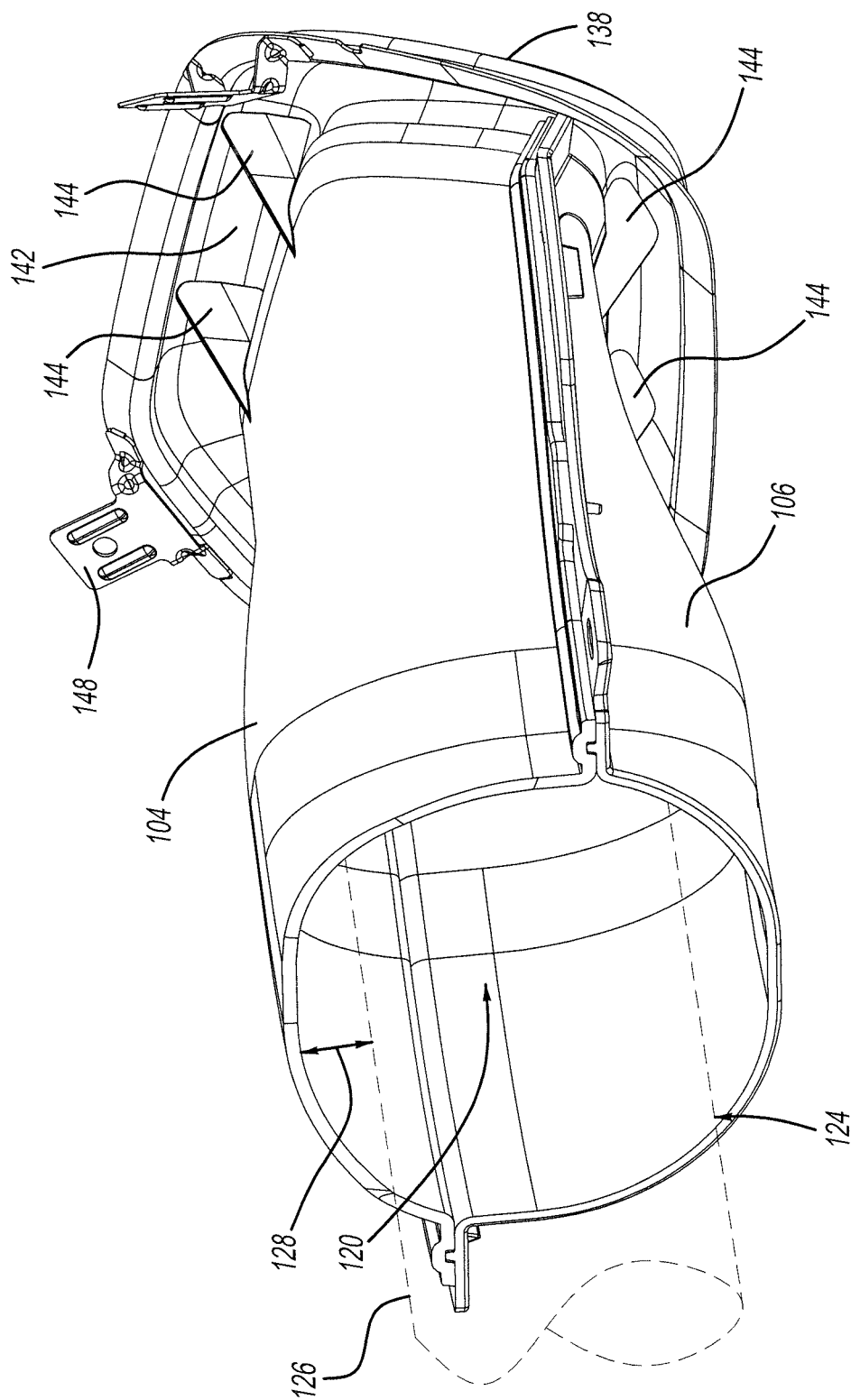
FIG. 10 is a rear perspective view of the two piece bracket.
Figure 11:
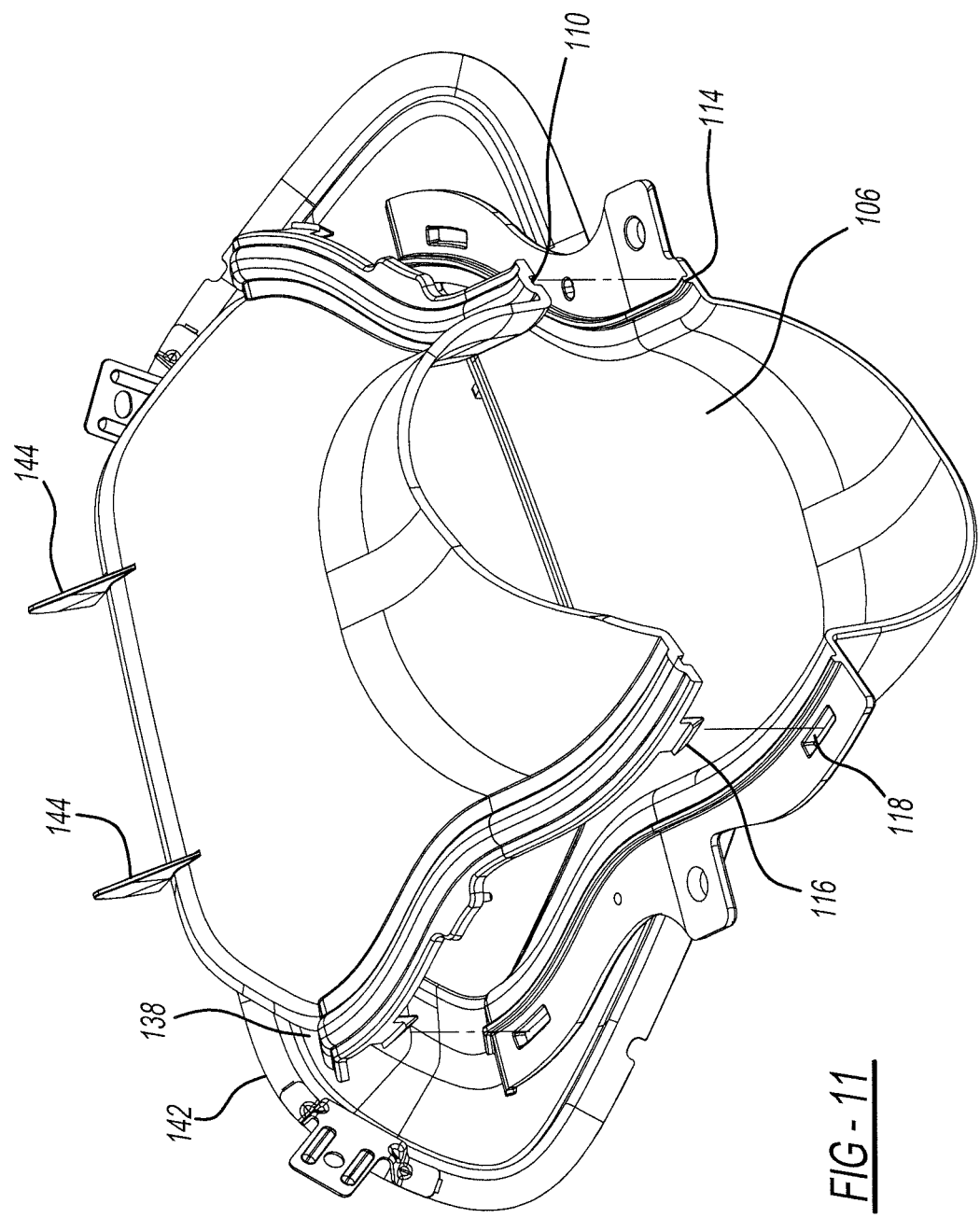
FIG. 11 is an expanded rear perspective view of the two piece bracket in a disassembled state.
Figure 12:
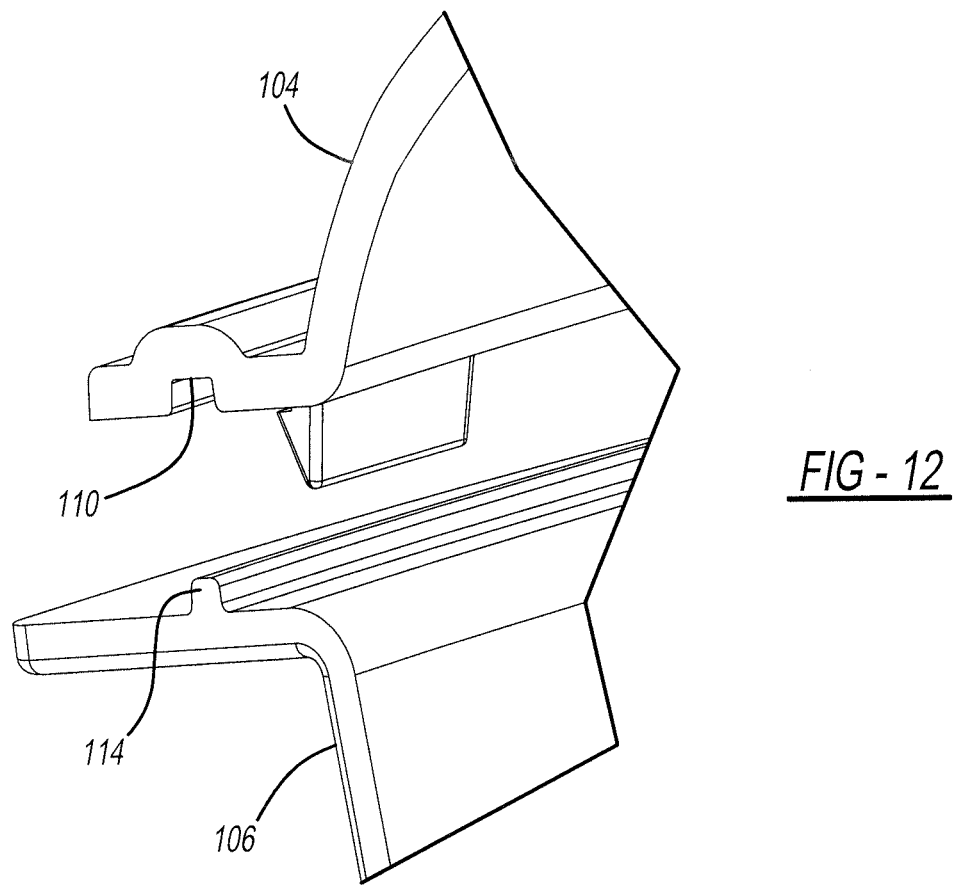
FIG. 12 is an enlarged perspective view of a portion of the disassembled two piece bracket.

Referring to FIGS. 8-10, a second embodiment showing an exhaust module assembly 100 is shown. The exhaust module assembly 100 has a two piece bracket 102 with a first bracket body piece 104 and a second bracket body piece 106. The first bracket body piece 104 has a flange surface 108 with an alignment groove 110 formed on the flange surface. The flange surface 108 of the first bracket body piece 104 abuts against a flange surface 112 on the second bracket body piece 106. The flange surface 112 on the second bracket body piece 106 has a rib 114 that is configured to be placed within the alignment groove 110 to align the first bracket body piece 104 and second bracket body piece 106 during assembly. While the alignment groove 110 and the rib 114 are shown on the first bracket body piece 104 and second bracket body piece 106 respectively, it is within the scope of this invention for the two structures to be reversed such that the alignment groove 110 is on the second bracket body piece 106 and the rib 114 is on the first bracket body piece 104.

When the first bracket body piece 104 and second bracket body piece 106 are positioned such that the rib 114 is within the alignment groove 110 and the flange surface 108 and flange surface 112 are in abutment, the first bracket body piece 104 and second bracket body piece 106 can be connected together using a number of different techniques, including but not limited to adhesives, fasteners, resistive implant welding, or other mechanical features.

In particular, the first bracket body piece 104 has a number of tabs 116 that slide into a respective aperture 118 formed on the second bracket body piece 106. This provides a mechanical connection between the first bracket body piece 104 and second bracket body piece 106 in order to hold the two piece bracket 102 together. It is within the scope of this invention for the tabs 116 and aperture 118 on the first bracket body piece 104 and the second bracket body piece 106 to be reversed or arranged in an alternating fashion between the first bracket body piece 104 and second bracket body piece 106 depending on the need of a particular application. For example, one particular application of the present embodiment of the invention might benefit from having the tabs 116 placed on the second bracket body piece 106 while the aperture 118 is formed on the first bracket body piece 104.

Additionally, in order to help further facilitate proper alignment between the first bracket body piece 104 and the second bracket body piece 106, it is within the scope of this invention to alternate the placement of the tab 116 and the aperture 118 such that the first bracket body piece 104 and the second bracket body piece 106 have alternating tab 116 with aligning aperture 118 that will provide confirmation that the first bracket body piece 104 and second bracket body piece 106 are properly aligned during assembly. The tabs 116 and apertures 118 can be used in connection with other fastening means such as adhesives, resistive implant welding or fasteners.

Once the two piece bracket 102 has been assembled, there is a flow cavity 120 created through the two piece bracket 102 that has a bracket inlet 124 and bracket outlet 122 located at opposing ends of the flow cavity 120. The two piece bracket 102 is configured to be positioned such that an exhaust pipe 126 of a vehicle exhaust system is placed within the flow cavity 120, within the area of the bracket inlet 124. The exhaust pipe 126 is positioned within the bracket inlet 124 in such a way that there is a clearance 128 between the exhaust pipe 126 and an inside surface 130 of the two piece bracket 102 that defines the flow cavity 120. The exhaust pipe 126 is not connected to the two piece bracket 102. The two piece bracket 102 is instead connected to a vehicle 132 and a vehicle at a frame or vehicle fascia 134 using one or more mounting flanges 136 formed on either the first bracket body piece 104 and/or the second bracket body piece 106.

The two piece bracket 102 has a ring tip 138 that is a decorative ring tip that has mounting flanges 140 that are capable of connecting directly to the vehicle 132, and specifically, the vehicle fascia 134. The ring tip 138 has a front side decorative surface that is visible when viewing the vehicle fascia 134 with the ring tip 138 connected. The ring tip 138 also has a rear side surface 142 that has a generally U-shaped cross-section. The two piece bracket 102 has two or more ribs 144 extending from the outside surface 146 of the two piece bracket 102. The ribs 144 may be formed or extending from either or both of the first bracket body piece 104 and second bracket body piece 106. The two or more ribs 144 are configured to slide in and press fit against the ring tip 138 by frictionally engaging the U-shaped cross-sectional back side surface 142 of the ring tip 138.

Figure 14:
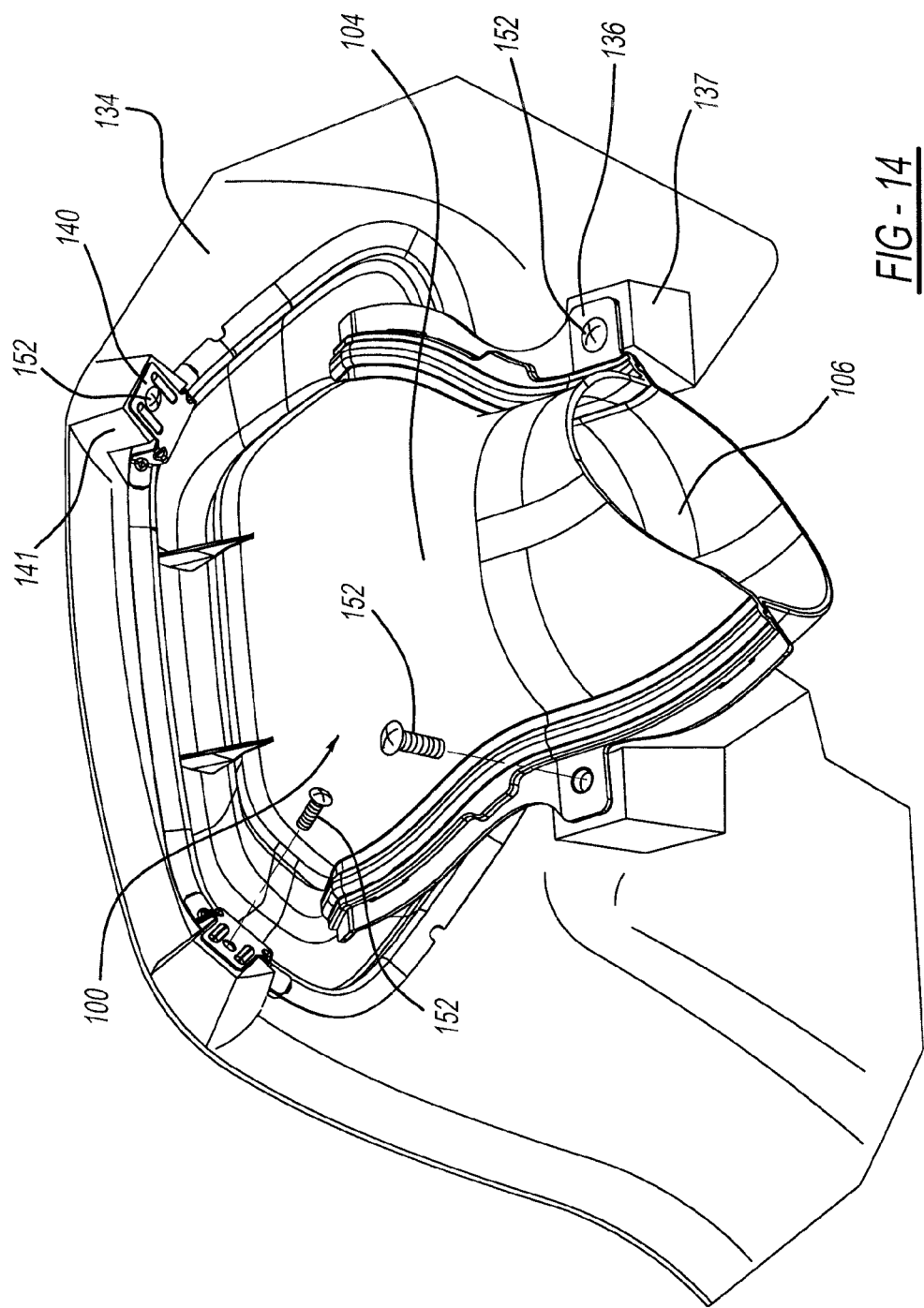
FIG. 14 is a rear perspective view of the two piece bracket connected to a vehicle fascia.
Figure 15:
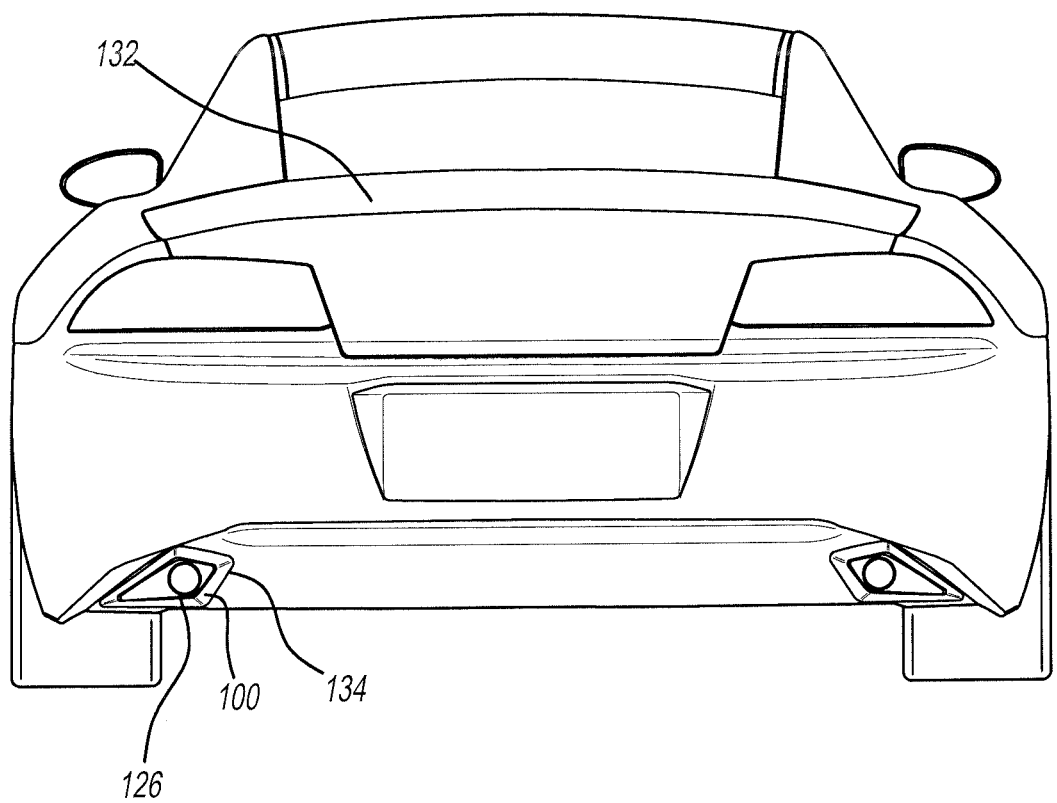
FIG. 15 is a plan view of a vehicle with two piece bracket connected.

Referring out to FIG. 15 a vehicle 132 is showing having a vehicle fascia 134 with the exhaust module assembly 100 mounted to the rear side of the vehicle fascia 134. The exhaust pipe 126 of the vehicle 132 is positioned within the exhaust module assembly 100. FIG. 14 shows an expanded rearview of the vehicle fascia 134 with the exhaust module assembly 100 connected. The two-piece bracket 102 has mounting flanges 136 that are formed on the second bracket body piece 106. Mounting flanges 136 are configured to align with and connect to individual bracket mounting blocks 137 formed on the rear surface of the vehicle fascia 134. Well a specific mounting block is shown it is within the scope of this invention for a different type of structure to be present. When the mounting flanges 136 are placed on the bracket mounting block 137, A fastener 152 is place through the whole of the mounting flange 136 in order to connect the two piece bracket 102 to the vehicle fascia 134. The ring tip 138 of the exhaust modules 100 has multiple ring tip brackets 140 extending from the edge of the ring tip 138. Each of the ring tip brackets 140 are configured to rest and be connected to one corresponding ring tip block 141 formed on the rear surface of the vehicle fascia 134. A fastener 152 is also used to secure the connection of the ring tip 138 to the vehicle fascia 134. FIG. 14 shows two fasteners connected to their respective mounting flange 136 and ring tip bracket 140, while two of the fasteners 152 are shown expanded away from the respective mounting flange is 136 and bracket 142 demonstrate or show the aperture through the flange or bracket.

Figure 13:
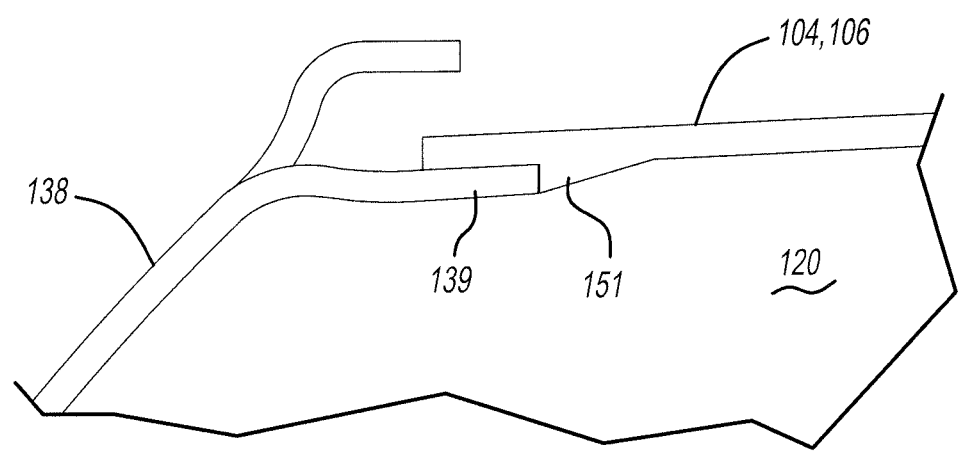
FIG. 13 is an enlarged plan cross-sectional view of a sleeve of the ring tip connected to the two piece bracket.

Referring now to FIG. 13 a partially cross-sectional view of the ring tip 138, first bracket body piece 104 or second bracket body piece 106 are shown. As shown the ring tip 138 has a sleeve 139 that slides into the bracket outlet 122 and abuts against a flange 151 formed on the inside surface of the flow cavity 120 of the two-piece bracket 102. The use of the sleeve 139 and flange 151 prevents be over insertion of the ring tip 138 into the first bracket body piece 104 and second bracket body piece 108. This also helps to maintain the proper clearance between the ring tip 138 and the exhaust pipe 126, which can cause the ring tip 138 to become discolored position to closely to the hot exhaust gasses. The flange 151 and ring sleeve 139 are additional features and are not necessary for each embodiment of the invention. For example some designs may not require the use of a sleeve 139 and flange 151.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An exhaust module assembly comprising:
a two piece bracket formed entirely of polymer and defining an exhaust flow path, said two piece bracket having a first bracket body piece and a second bracket body piece;
an alignment groove formed on one of the first bracket body piece or the second bracket body piece and a rib formed on the other one of the first bracket body piece or the second bracket body piece for connecting and aligning the first bracket body piece and the second bracket body piece together;
a bracket inlet of said two piece bracket, said bracket inlet surrounding but not in contact with an exhaust pipe, thereby creating a clearance between the exhaust pipe and the bracket inlet;
a bracket outlet of said two piece bracket connected to said bracket inlet; and
a ring tip connected to said bracket outlet.

2. The exhaust module of claim 1, further comprising a bezel portion of said bracket outlet wherein a sleeve of said ring tip slides onto said bezel portion and said bezel portion supports said ring tip.

3. The exhaust module of claim 1, wherein said ring tip is made from one selected from the group consisting of polycarbonate (PC), acrylonitrile butadiene styrene (ABS), and combinations thereof and said ring top is chrome plated.

4. The exhaust module of claim 1, wherein said ring tip is made from a thin-gauge bright stainless steel having a thickness less than fifty thousandths of an inch.

5. The exhaust module of claim 1, wherein said two piece bracket is made from a polymer, one selected from the group comprising a glass-filled nylon material, thermoplastic olefin, acrylonitrile butadiene styrene and combinations thereof.

6. The exhaust module of claim 1 wherein said ring tip has an inner edge and is configured to contact an abutment formed on an inside surface of the exhaust flow path of the two piece bracket in order to prevent over insertion of the inner edge of the ring tip.

7. The exhaust module assembly of claim 1 further comprising:
one or more mounting features on said ring tip; and
one or more mounting features on said bracket outlet for engaging said one or more mounting features on said ring tip and connecting said ring tip to said bracket outlet of said bracket.

8. The exhaust module of claim 7 wherein said one or more mounting features on said bracket outlet includes two or more ribs extending from an outside surface of the first bracket body piece and the second bracket body piece for being press fit into the one or more mounting features of the ring tip that is located on the back side surface of the ring tip in order to facilitate the alignment and holding of the two piece bracket with the ring tip.

9. The exhaust module of claim 1 further comprising at least one tab formed on one of the first bracket body piece or the second bracket body piece and an aperture formed on the other one of the first bracket body piece or the second bracket body piece, wherein the at least one tab is configured to be inserted into the one or more apertures in order to lock together the first bracket body piece and the second bracket body piece.

10. The exhaust module of claim 1 further comprising:
a rear fascia;
one or more mounting flanges formed on said bracket for connecting said bracket to said rear fascia.

11. The exhaust module assembly of claim 10 wherein there is a gap defined by the distance between said ring tip and said rear fascia and said gap is less than 5 mm.

12. An exhaust module assembly comprising:
a two piece bracket formed entirely of polymer and defining an exhaust flow path, wherein said two piece bracket further includes a first bracket body piece having a flange surface with an alignment groove formed on the flange surface and a second bracket body piece having a flange surface with a rib formed on the flange surface, wherein the first bracket body piece and the second bracket body piece are connected together by abutting the flange of the first bracket body piece with the flange of the second bracket body piece such that the rib is aligned in the groove in order to connect and align the first bracket body piece and the second bracket body piece together;
- a bracket inlet of said two piece bracket, said bracket inlet surrounding, but not in contact with an exhaust pipe, thereby creating a clearance between the exhaust pipe and the bracket inlet;
- a bracket outlet of said two piece bracket connected to said bracket inlet; and
- a ring tip connected to said bracket outlet.

13. The exhaust module of claim 12, further comprising a bezel portion of said bracket outlet wherein a sleeve of said ring tip slides onto said bezel portion and said bezel portion supports said ring tip.

14. The exhaust module of claim 12, wherein said ring tip is made from one selected from the group consisting of polycarbonate (PC), acrylonitrile butadiene styrene (ABS), and combinations thereof and said ring top is chrome plated.

15. The exhaust module of claim 12, wherein said ring tip is made from a thin-gauge bright stainless steel having a thickness less than fifty thousandths of an inch.

16. The exhaust module of claim 12, wherein said two piece bracket is made from a polymer, one selected from the group comprising a glass-filled nylon material, thermoplastic olefin, acrylonitrile butadiene styrene and combinations thereof.

17. The exhaust module of claim 12, wherein said ring tip has an inner edge and is configured to contact an abutment formed on an inside surface of the exhaust flow path of the two piece bracket in order to prevent over insertion of the inner edge of the ring tip.

18. The exhaust module assembly of claim 12 further comprising:
- one or more mounting features on said ring tip; and
- one or more mounting features on said bracket outlet for engaging said one or more mounting features on said ring tip and connecting said ring tip to said bracket outlet of said bracket.

19. The exhaust module of claim 18 wherein said one or more mounting features on said bracket outlet includes two or more ribs extending from an outside surface of the first bracket body piece and the second bracket body piece for being press fit into the one or more mounting features of the ring tip that is located on the back side surface of the ring tip in order to facilitate the alignment and holding of the two piece bracket with the ring tip.

20. The exhaust module of claim 12 further comprising at least one tab formed on one of the first bracket body piece or the second bracket body piece and an aperture formed on the other one of the first bracket body piece or the second bracket body piece, wherein the at least one tab is configured to be inserted into the one or more apertures in order to lock together the first bracket body piece and the second bracket body piece.

21. The exhaust module of claim 12 further comprising:
- a rear fascia;
- one or more mounting flanges formed on said bracket for connecting said bracket to said rear fascia.

22. The exhaust module assembly of claim 21 wherein there is a gap defined by the distance between said ring tip and said rear fascia and said gap is less than 5 mm.

23. An exhaust module assembly comprising:
- a two piece bracket formed entirely of polymer and defining an exhaust flow path, wherein said two piece bracket further includes a first bracket body piece having a flange surface with an alignment groove formed on the flange surface and a second bracket body piece having a flange surface with a rib formed on the flange surface, wherein the first bracket body piece and the second bracket body piece are connected together by abutting the flange of the first bracket body piece with the flange of the second bracket body piece such that the rib is aligned in the groove in order to connect and align the first bracket body piece and the second bracket body piece together;
- a bracket inlet of said two piece bracket, said bracket inlet surrounding, but not in contact with an exhaust pipe, thereby creating a clearance between the exhaust pipe and the bracket inlet;
- a bracket outlet of said two piece bracket connected to said bracket inlet; and
- a ring tip having a back side surface, wherein said first bracket body piece and said second bracket body piece each include one or more ribs extending from an outside surface of the first bracket body piece and the second bracket body piece that is in press fit contact with the back surface of the ring tip.

24. The exhaust module of claim 23, further comprising a bezel portion of said bracket outlet wherein a sleeve of said ring tip slides onto said bezel portion and said bezel portion supports said ring tip.

25. The exhaust module of claim 23, wherein said ring tip is made from one selected from the group consisting of polycarbonate (PC), acrylonitrile butadiene styrene (ABS), and combinations thereof and said ring top is chrome plated.

26. The exhaust module of claim 23, wherein said ring tip is made from a thin-gauge bright stainless steel having a thickness less than fifty thousandths of an inch.

27. The exhaust module of claim 23, wherein said two piece bracket is made from a polymer, one selected from the group comprising a glass-filled nylon material, thermoplastic olefin, acrylonitrile butadiene styrene and combinations thereof.

28. The exhaust module of claim 23, wherein said ring tip has an inner edge and is configured to contact an abutment formed on an inside surface of the exhaust flow path of the two piece bracket in order to prevent over insertion of the inner edge of the ring tip.

29. The exhaust module of claim 23 further comprising at least one tab formed on one of the first bracket body piece or the second bracket body piece and an aperture formed on the other one of the first bracket body piece or the second bracket body piece, wherein the at least one tab is configured to be inserted into the one or more apertures in order to lock together the first bracket body piece and the second bracket body piece.

* * * * *